(12) United States Patent
Ikemoto et al.

(10) Patent No.: US 9,047,524 B2
(45) Date of Patent: Jun. 2, 2015

(54) VARIABLE CAPACITANCE ELEMENT AND HIGH-FREQUENCY DEVICE

(71) Applicant: Murata Manufacturing Co., Ltd., Nagaokakyo-shi, Kyoto-fu (JP)

(72) Inventors: Nobuo Ikemoto, Nagaokakyo (JP); Toshiyuki Nakaiso, Nagaokakyo (JP); Katsumi Taniguchi, Nagaokakyo (JP); Naoki Gouchi, Nagaokakyo (JP); Naoto Ikeda, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/255,994

(22) Filed: Apr. 18, 2014

(65) Prior Publication Data

US 2014/0225793 A1  Aug. 14, 2014

Related U.S. Application Data

(63) Continuation of application No. PCT/JP2012/077419, filed on Oct. 24, 2012.

(30) Foreign Application Priority Data

Oct. 26, 2011 (JP) ................. 2011-234602

(51) Int. Cl.
*H01Q 7/00* (2006.01)
*H01Q 1/22* (2006.01)
(Continued)

(52) U.S. Cl.
CPC ............ *G06K 7/10336* (2013.01); *G06K 19/07* (2013.01); *G06K 19/077* (2013.01);
(Continued)

(58) Field of Classification Search
CPC ........ H01Q 7/005; H01Q 7/00; H01Q 1/2225; H01Q 1/243
USPC ........................................ 343/748, 749, 750
See application file for complete search history.

(56) References Cited

U.S. PATENT DOCUMENTS 3,569,795 A  3/1971  Gikow
4,973,979 A  11/1990  Ikeda
(Continued)

FOREIGN PATENT DOCUMENTS

CN  1294765 A  5/2001
CN  1957464 A  5/2007
(Continued)

OTHER PUBLICATIONS

Official Communication issued in International Patent Application No. PCT/JP2012/077419, mailed on Jan. 29, 2013.
(Continued)

*Primary Examiner* — Dameon E Levi
*Assistant Examiner* — Jennifer F Hu
(74) *Attorney, Agent, or Firm* — Keating & Bennett, LLP (57) ABSTRACT

A high-frequency device includes an antenna coil, a variable capacitance element, and an RFIC. The variable capacitance element is configured by capacitor units in each of which a ferroelectric film is sandwiched between capacitor electrodes, and a capacitance value changes according to a control voltage applied between the capacitor electrodes. A control voltage application circuit configured by a plurality of resistance elements of different resistance values, and a resistance element of the variable capacitance element unit configured to apply a control voltage to the variable capacitance element are arranged in a layered manner above the capacitor unit. Thus, a variable capacitance element and a high-frequency device that includes a control voltage application circuit eliminating problems such as distortion due to active elements and growing IC size along with complication of circuit architecture, and ensuring reliability on impact due to falling or the like, are provided.

17 Claims, 9 Drawing Sheets

(51) Int. Cl.
  *H01Q 1/24* (2006.01)
  *G06K 7/10* (2006.01)
  *G06K 19/07* (2006.01)
  *G06K 19/077* (2006.01)
  *H04B 5/02* (2006.01)
  *H04B 5/00* (2006.01)
  *H01G 7/00* (2006.01)

(52) U.S. Cl.
  CPC ............... *H04B 5/02* (2013.01); *H04B 5/0062* (2013.01); *H04B 5/0081* (2013.01); *H01Q 1/2225* (2013.01); *H01Q 1/243* (2013.01); *H01Q 7/005* (2013.01); *G06K 19/07779* (2013.01); *H01G 7/00* (2013.01); *H01Q 5/10* (2015.01)

(56) References Cited

U.S. PATENT DOCUMENTS

| | | | |
|---|---|---|---|
| 5,589,845 A | 12/1996 | Yandrofski et al. | |
| 6,078,110 A | 6/2000 | Zakharian | |
| 7,092,232 B2* | 8/2006 | Yamagata et al. | 361/277 |
| 8,675,337 B2* | 3/2014 | Baniecki et al. | 361/277 |
| 2006/0018082 A1 | 1/2006 | Yamagata et al. | |
| 2006/0220863 A1 | 10/2006 | Koyama | |
| 2008/0001309 A1 | 1/2008 | Tago | |
| 2008/0106350 A1* | 5/2008 | McKinzie | 333/17.3 |
| 2009/0051610 A1 | 2/2009 | Sugiyama | |
| 2009/0134943 A1 | 5/2009 | Kiyohara | |
| 2009/0295543 A1 | 12/2009 | Kita | |
| 2010/0056098 A1* | 3/2010 | Kanno et al. | 455/343.1 |
| 2010/0156574 A1 | 6/2010 | Nohara | |

FOREIGN PATENT DOCUMENTS

| | | |
|---|---|---|
| CN | 101373861 A | 2/2009 |
| JP | 01-164125 A | 6/1989 |
| JP | 2005-064437 A | 3/2005 |
| JP | 2006-049840 A | 2/2006 |
| JP | 2006-295905 A | 10/2006 |
| JP | 2008-258186 A | 10/2008 |
| JP | 2008-0258670 A | 10/2008 |
| JP | 2009-290644 A | 12/2009 |
| JP | 2010-147743 A | 7/2010 |
| JP | 2011-078040 A | 4/2011 |
| JP | 2011-135447 A | 7/2011 |
| JP | 2011-142384 A | 7/2011 |
| WO | 2013/061985 A1 | 5/2013 |

OTHER PUBLICATIONS

Official Communication issued in corresponding UK Patent Application No. GB1408935.3, mailed on Jul. 21, 2014.

Official Communication issued in corresponding Chinese Patent Application No. 201280052633.6, mailed on Sep. 30, 2014.

* cited by examiner

VARIABLE CAPACITANCE ELEMENT AND HIGH-FREQUENCY DEVICE

BACKGROUND OF THE INVENTION

1. Field of the Invention

The present invention relates to a variable capacitance element and a high-frequency device that include a control voltage application circuit preferably for use in an RFID (Radio Frequency Identification) system or a near field communication (NFC: Near Field Communication) system, in which communication with a target device is performed by an electromagnetic field signal.

2. Description of the Related Art

The NFC is one of near field communication standards using a frequency band of 13 MHz, and expected to be applied to various terminals including mobile communication terminals. A mobile communication terminal using NFC typically has an RFIC for NFC built in a main body of the terminal, and the RFIC for NFC is connected to an antenna coil for NFC that is also built within the terminal main body. Further, the antenna coil is connected to a capacitance element so as to resonate at a communication frequency, and the capacitance element and the antenna coil constitute an antenna circuit. In addition, the antenna circuit and the RFIC for NFC or the like constitute a wireless communication module (hereinafter referred to as "NFC module").

While a communication frequency for the NFC module is previously determined, a resonant frequency to which the antenna circuit is to be tuned varies in some degree depending on its use conditions and a production tolerance. For example, a circuit architecture of the antenna circuit as a resonance circuit is different between a reader/writer mode and a card mode. Accordingly, it is necessary to adjust the resonance circuit according to the mode so that a predetermined resonant frequency is maintained in the both modes. Further, the use conditions change according to an environment in which the NFC module is installed. For example, the resonant frequency of the antenna circuit changes depending on whether or not there is metal near the NFC module.

If a frequency band of the antenna in the NFC module is sufficiently broad, fine adjustment due to the difference in the use conditions is not necessary. However, it has become difficult to ensure an adequate antenna size as the terminals of late are increasingly downsized, and the antenna's bandwidth may not be broadened if the size of the antenna is small. Therefore, it is necessary to adjust the resonant frequency to achieve an optimal value.

As one method of adjusting the resonant frequency, there is known an antenna circuit including a capacitor configured by a variable capacitance element capable of changing a capacitance value by an applied voltage (See, for example, Japanese Patent Unexamined Publication No. 2009-290644). Alternatively, Japanese Patent Unexamined Publication No. 2010-147743 discloses a circuit that switches between entire capacitance values by selectively connecting a plurality of capacitors.

Figure 9:
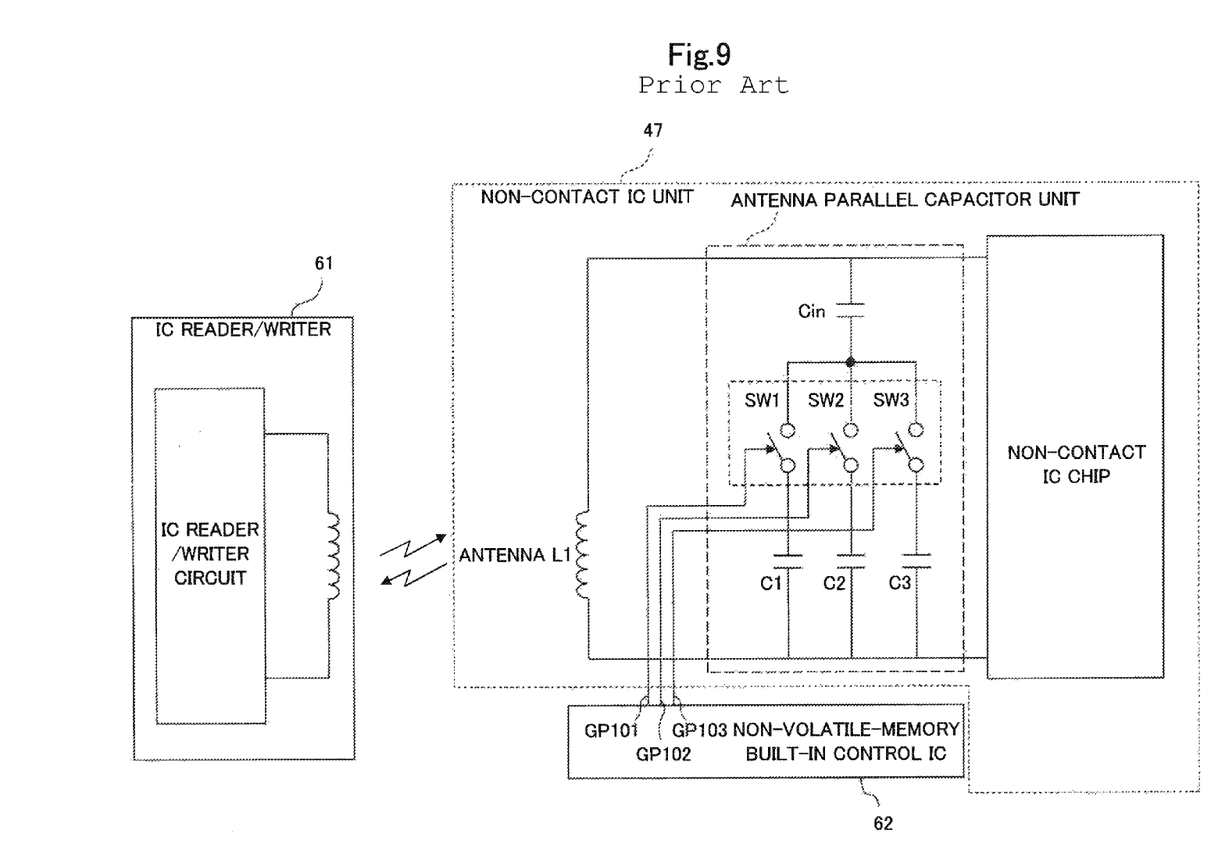
FIG. 9 is a circuit diagram of a communication circuit disclosed in Japanese Patent Unexamined Publication No. 2010-147743.

FIG. 9 is an example of a communication circuit disclosed in Japanese Patent Unexamined Publication No. 2010-147743. In the drawing, a non-contact IC unit 47 is configured by a non-contact IC chip, an antenna parallel capacitor unit having a capacitor Cin, parallel capacitors C1 to C3, and the switches SW1 to SW3, and an antenna L1. Values of electric capacitances of the capacitor Cin and the parallel capacitors C1 to C3 are static. The switches SW1 to SW3 are circuits for switching between ON and OFF of the parallel capacitors C1 to C3, respectively. After the non-contact IC unit 47 is incorporated in a mobile telephone 1, a control IC 62 having a non-volatile memory built in is connected to the non-contact IC unit 47. The control IC 62 controls the switches SW1 to SW3 of the non-contact IC unit 47 to switch between ON and OFF of the switches SW1 to SW3.

However, when a variable-capacitance diode and a switching circuit are provided, it is necessary to provide a space for mounting these active elements, and there is often a case in which the resonant frequency changes because distortion may easily occur since these elements are active elements. Further, a large number of capacitors and switches are necessary in order to adjust the capacitance value in fine steps by switching between the plurality of capacitors. This may adversely complicate the circuit architecture, and increase the size of an IC.

Alternatively, it is possible to use a trimmer capacitor to mechanically set the capacitance value. However, this may easily make an RFID device complicated and larger since mechanical control is required in order to change its capacitance value, and it is often not possible to ensure reliability on impact due to falling or the like.

SUMMARY OF THE INVENTION

Preferred embodiments of the present invention provide a variable capacitance element and a high-frequency device that include a control voltage application circuit that eliminates problems such as distortion due to active elements and growing IC size along with complication of circuit architecture, and ensures reliability on impact due to falling or the like.

A high-frequency device according to a preferred embodiment of the present invention includes an antenna coil, a variable capacitance element configured to change a resonant frequency of an antenna circuit including the antenna coil, and an RFIC connected to the variable capacitance element, wherein the variable capacitance element includes ferroelectric capacitors each configured such that a ferroelectric film is sandwiched between capacitor electrodes and such that a capacitance value changes according to a value of a control voltage applied between the capacitor electrodes, and a control voltage application circuit including a resistance voltage divider circuit including a plurality of resistance elements having different resistance values and configured to apply a control voltage to the variable capacitance element.

With this configuration, a problem of distortion is eliminated since a switch that is an active element is not used, and the size of an IC is significantly downsized along with simplifying circuit architecture. Further, it is easily possible to ensure reliability on impact due to falling or the like.

Preferably, each of the plurality of resistance elements includes a first terminal connected to the control voltage application circuit, and a second terminal connected to each of IO terminals of the RFIC.

With this configuration, the control voltage to be applied to the variable capacitance element is generated using a simple circuit, and complication of circuit architecture is effectively eliminated.

Preferably, the plurality of resistance elements are resistance patterns provided on a substrate, and each of the resistance patterns are provided such that resistance values of the plurality of resistance elements are in a ratio based on powers of 2 with respect to a lowest value among the resistance values.

With this configuration, it is possible to achieve a linear relationship between values of the control data and the control voltage for the variable capacitance element with a relatively smaller number of IO terminals, and to facilitate setting in multiple steps at constant resolution.

Preferably, the variable capacitance element and the control voltage application circuit are provided on the substrate using a thin film process, and the plurality of resistance elements are provided on the substrate in one layer using one process.

With this configuration, the number of the components is reduced, wiring of the data transmission lines is simplified to a large extent, and thus the size and the weight of the communication circuit are reduced. In addition, a ratio between the resistance elements is stabilized even if there is an overall variation in the resistance values of the resistance elements vary, that is, even if there is a variation in absolute values. Therefore, the voltage dividing ratio of the resistance voltage divider circuit is constant, and it is possible to always apply a predetermined stable control voltage to the variable capacitance element.

Preferably, the variable capacitance element includes a plurality of RF resistance elements connected in parallel to both ends of the respective ferroelectric capacitors, and the RF resistance elements are provided in a layer different from the layer in which the plurality of resistance elements are provided.

With this configuration, it is possible to determine most appropriate resistance values for the RF resistance element and the voltage-dividing resistance element independently.

A variable capacitance element according to another preferred embodiment of the present invention includes ferroelectric capacitors each configured such that a ferroelectric film is sandwiched between capacitor electrodes, and a control voltage application circuit connected to the ferroelectric capacitors, provided with a plurality of resistance elements with different resistance values, and configured to apply a control voltage whose value of a voltage applied to the ferroelectric capacitor changes in a plurality of ways.

With this configuration, a problem of distortion is eliminated since a switch that is an active element is not used, and the size of an IC is significantly downsized along with simplifying circuit architecture. Further, it is easily possible to ensure reliability on impact due to falling or the like.

According to various preferred embodiments of the present invention, ferroelectric capacitors each including a ferroelectric film sandwiched between capacitor electrodes are preferably used as a variable capacitance element configured to control a resonant frequency of an antenna coil, and a plurality of resistance elements having different resistance values are preferably used as a control voltage application circuit to apply a control voltage to the ferroelectric capacitors. Therefore, it is possible to achieve a variable capacitance element and a high-frequency device that have a control voltage application circuit with which although small, distortion does not easily occur and frequency characteristics are stable and reliable. Further, it is not necessary to use a variable capacitance element that requires mechanical control such as a trimmer capacitor. Therefore, it is possible to achieve a variable capacitance element and a high-frequency device that have a control voltage application circuit with which although small, high reliability on impact due to falling or the like is achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
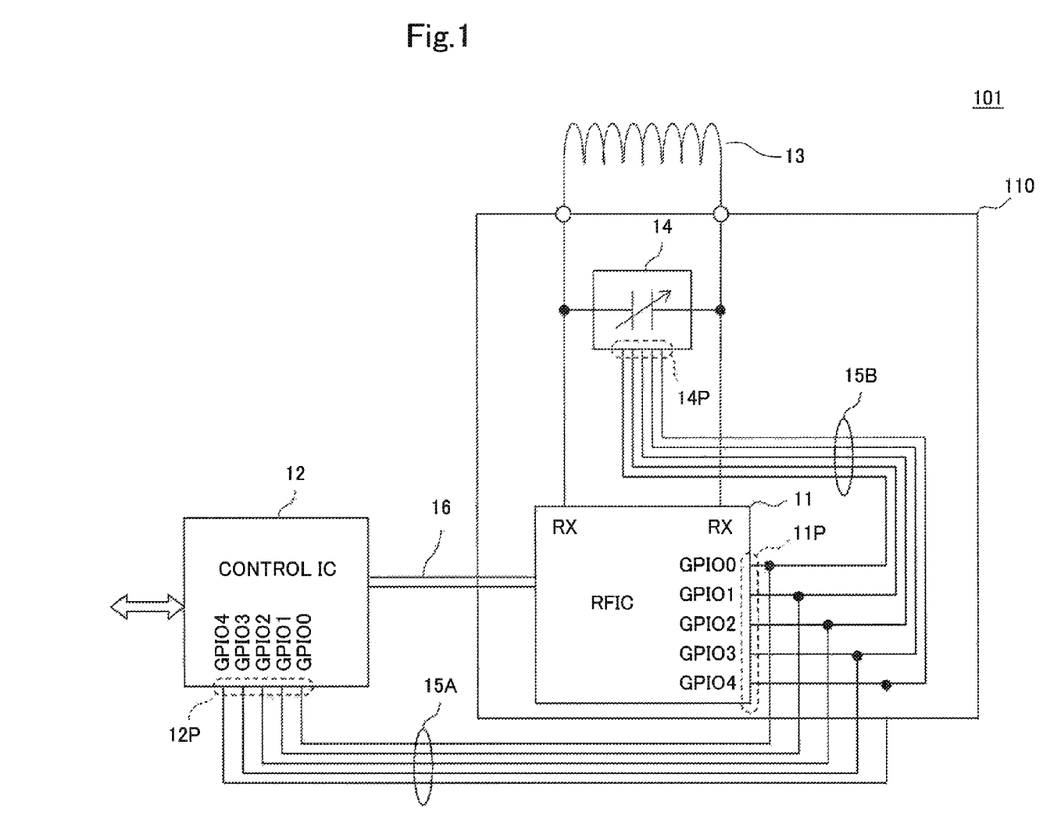
FIG. 1 is a circuit diagram of a communication circuit 101 including a variable capacitance element and a high-frequency device according to a preferred embodiment of the present invention.

FIG. 1 is a circuit diagram of a communication circuit 101 including a variable capacitance element and a high-frequency device that include a control voltage application circuit. The communication circuit 101 is one example of NFC modules. The communication circuit 101 preferably includes an RFIC 11, a control IC 12, an antenna coil 13, and a variable capacitance element 14. The variable capacitance element 14 and the RFIC 11 constitute a variable-capacitance-element built-in RFIC 110. In the present preferred embodiment, the variable capacitance element 14 preferably is the variable capacitance element including a control voltage application circuit. A circuit configured by the variable-capacitance-element built-in RFIC 110 and the antenna coil 13 corresponds to a "high-frequency device" according to various preferred embodiments of the present invention.

The RFIC 11 includes IO terminals 11P for GPIO (General Purpose Input/Output). Similarly, the control IC 12 includes IO terminals 12P for GPIO.

The RFIC 11 performs conversion between a baseband signal and a high-frequency signal. The control IC controls the RFIC 11, and receives and transmits data including communication data.

The variable capacitance element 14 includes control terminals 14P. The variable capacitance element 14 includes a capacitance element whose capacitance value is determined according to a control voltage, and a resistance voltage divider circuit that generates the control voltage by dividing a voltage inputted to the control terminals.

To two RX terminals (received signal terminals) of the RFIC 11, the variable capacitance element 14 and the antenna coil 13 of a parallel circuit are connected.

The IO terminals 11P of the RFIC 11 and the IO terminals 12P of the control IC 12 are connected by signal lines 15A, and the control terminals 14P of the variable capacitance element 14 are connected to the signal lines 15A and 15B.

The RFIC 11 and the control IC 12 receive and transmit communication signals via the data transmission lines 16, and the control IC 12 controls various setting or the like for the RFIC 11 via the signal lines 15A. In addition, the RFIC 11 or the control IC 12 supplies control data to the variable capacitance element 14 via the signal lines 15A and 15B.

The variable capacitance element 14 and the antenna coil 13 constitute an antenna circuit which is an LC parallel resonance circuit, and determine a resonant frequency of the antenna circuit. The antenna coil 13 is coupled with an antenna of a communication destination by electromagnetic field coupling, and performs transmission and reception for close range communication.

Figure 2:
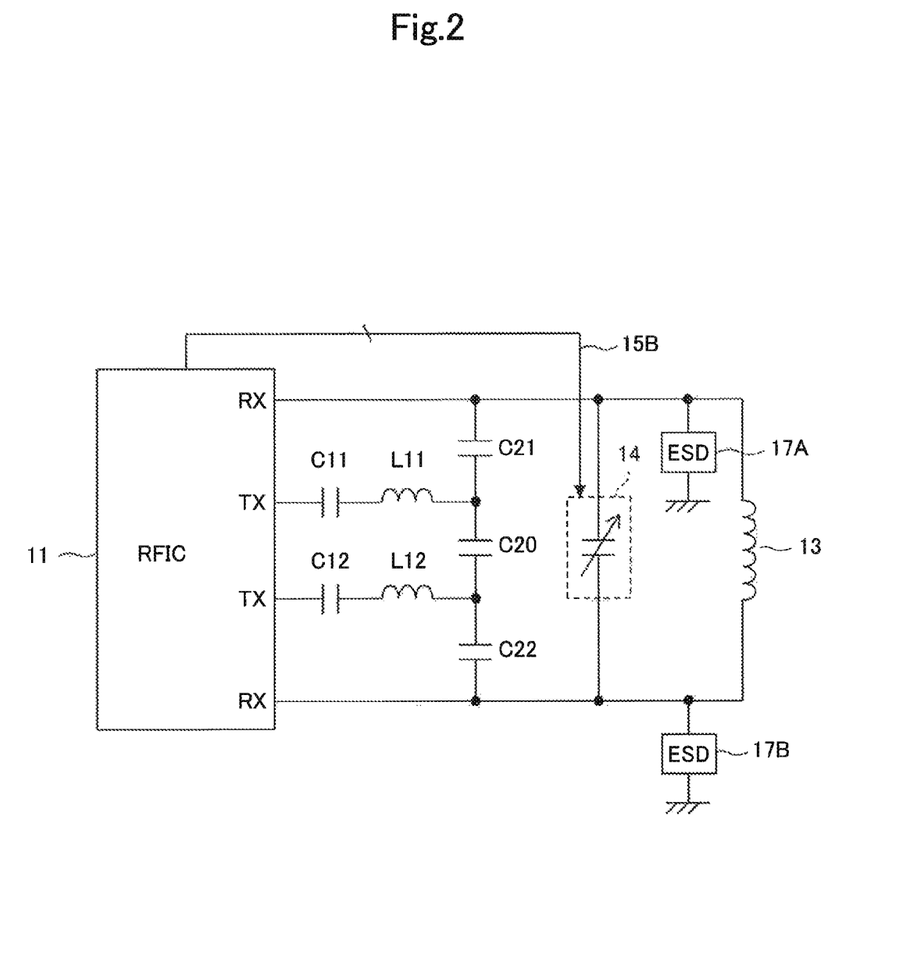
FIG. 2 is a detailed diagram of circuits provided between an RFIC 11 and an antenna coil 13.

FIG. 2 is a detailed diagram of circuits provided between the RFIC 11 and the antenna coil 13. FIG. 2 also shows a circuit connected to two TX terminals (transmitted signal terminal) of the RFIC 11. In FIG. 2, the antenna coil 13 defines and serves as a radiating element, and exchanges wireless signals with a coil antenna of a destination of communication based on magnetic field coupling with the coil antenna of the destination of communication. The antenna coil 13 preferably is a looped electrode pattern including a plurality of turns or winds.

Capacitors C21 and C22 are elements that adjust a degree of coupling between the RFIC 11 and the antenna coil 13. Further, the inductors L11 and L12 and the capacitors C11, C12, and C20 constitute a transmission filter. For example, since the RFIC 11 operates passively when the communication circuit operates in the card mode, the RFIC 11 generates a source voltage from an input signal inputted to the RX terminal and reads a reception signal, and performs load modulation of a circuit (load) connected to the TX terminal in transmission. Further, for example, since the RFIC 11 operates actively when the communication circuit operates in the reader/writer mode, the RFIC 11 opens the RX terminal to transmit a transmission signal from the TX terminal in transmission, and opens the TX terminal to receive a reception signal from the RX terminal. In this manner, in the communication circuit, impedance from the RFIC 11 toward the antenna coil 13 changes depending on the operation mode. As will be later described, the variable capacitance element 14 is controlled so that the resonant frequency of the antenna circuit is optimized depending on the operation mode (so that the impedance from the RFIC 11 toward the antenna coil matches).

Here, the ESD protection elements 17A and 17B are connected between the ground and both end terminals of the antenna coil 13, respectively.

Figure 3:
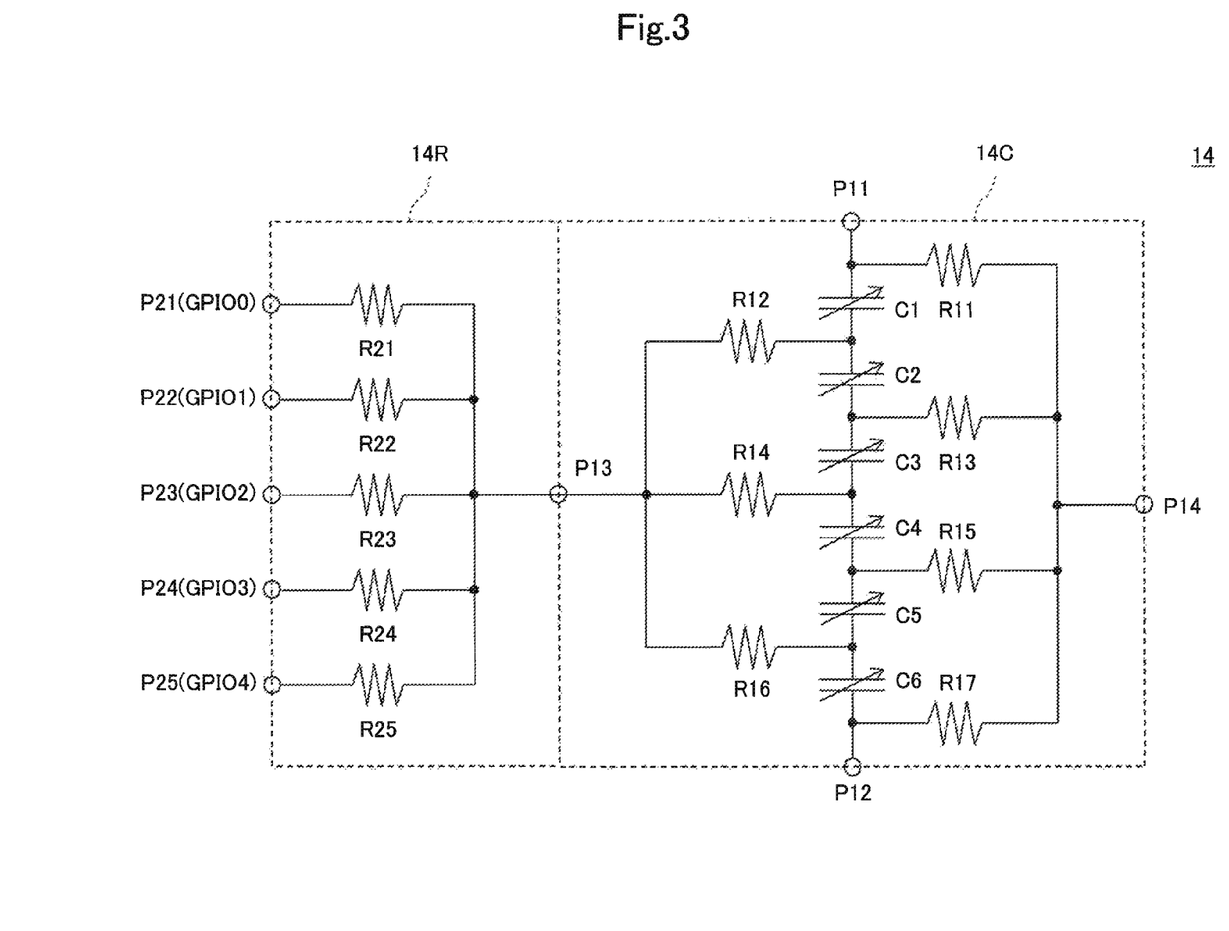
FIG. 3 is an entire circuit diagram within a variable capacitance element 14.

FIG. 3 is an entire circuit diagram within the variable capacitance element 14. The variable capacitance element 14 includes a control voltage application circuit 14R and a variable capacitance unit 14C. A capacitance value between ports P11-P12 of the variable capacitance unit 14C is determined according to a voltage applied between ports P13-P14. Ports P21-P25 of the control voltage application circuit 14R are connected to GPIO ports (GPIO0-GPIO4) of the RFIC 11 shown in FIG. 1. The ports P21-P25 are connected to one terminals of resistance elements R21-R25, and the other terminals of the resistance elements R21-R25 are connected in common to the port P13.

The RFIC 11 shown in FIG. 1 selectively sets the IO terminals 11P as the GPIO ports to high level (source voltage) or low level (ground voltage). Therefore, each of the resistance elements R21-R25 works as a resistance voltage divider circuit according to the level of the corresponding IO terminal of the RFIC 11, and a control voltage according to its voltage dividing ratio and the source voltage is applied to the port P13 of the variable capacitance unit 14C. Since the port P14 of the variable capacitance unit 14C is grounded, the control voltage is applied between the ports P13-P14 of the variable capacitance unit 14C. The effect of the voltage dividing will be described later in detail.

In the variable capacitance unit 14C, the control voltage is applied to both end terminals of each of the capacitance elements C1-C6 via RF resistance elements R11-R17. The RF resistance elements R11-R17 preferably have the same resistance value. The RF resistance elements R11-R17 apply the control voltage to the capacitance elements C1-C6, and prevent an RF signal applied between the ports P11-P12 from leaking to the ports P13 and P14. Each of the capacitance elements C1-C6 preferably is a ferroelectric capacitor configured such that a ferroelectric film is sandwiched between opposing electrodes, for example. Since the ferroelectric film changes its amount of polarization depending on an intensity of an electric field to be applied to change an apparent dielectric constant, it is possible to determine the capacitance value by the control voltage.

Figure 4:
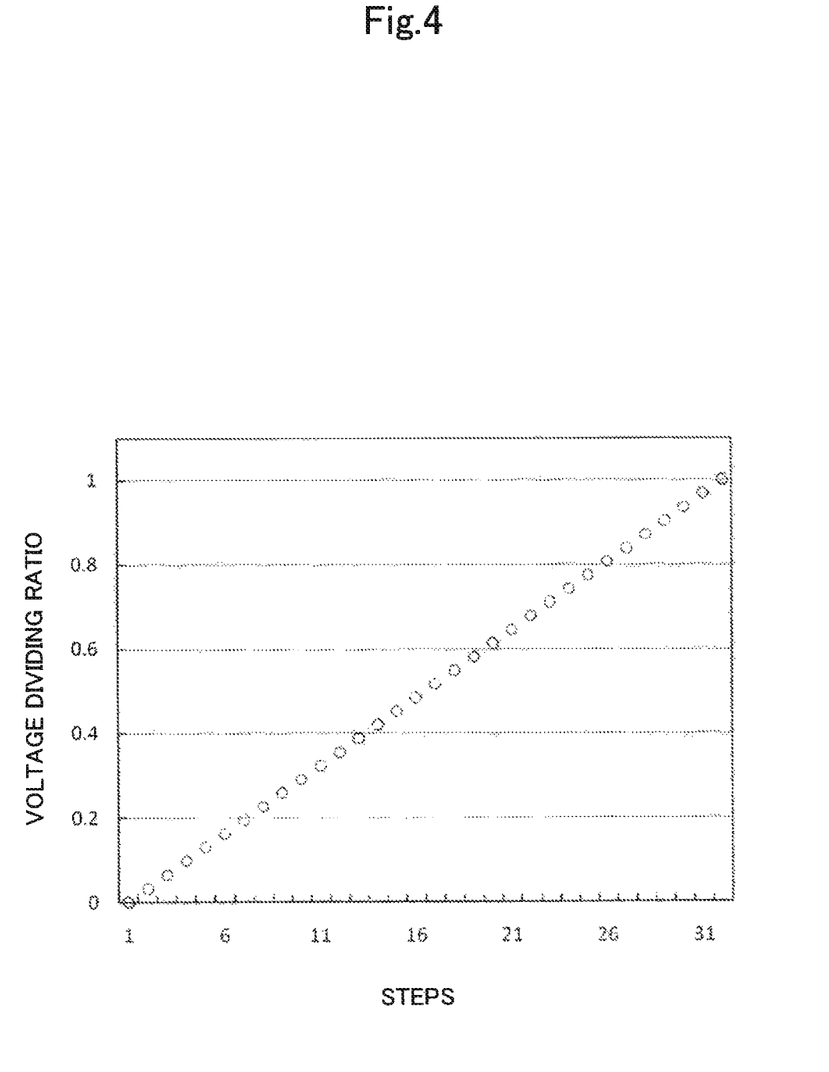
FIG. 4 is a chart showing a relationship between 5-bit values from ports P21-P25 shown in FIG. 3 and a resistance voltage dividing ratio.

FIG. 4 is a chart showing a relationship between 5-bit values from the ports P21-P25 shown in FIG. 3 and the resistance voltage dividing ratio. The resistance values of the resistance elements R21-R25 shown in FIG. 3 are determined to be in a ratio based on powers of 2 with respect to a lowest value among the resistance values. For example, the ratio between the resistance values of the resistance elements R21, R22, R23, R24, and R25 is determined to be approximately 1:2:4:8:16. For example, when R21 is about 10 kΩ, R22 is about 20 kΩ and R25 is about 160 kΩ.

For example, when the port P21 is high level and all of the ports P22-P25 are low level, the resistance element R21 constitutes an upper arm of the resistance voltage divider circuit, and a parallel circuit of the resistance elements R22-R25 constitutes a lower arm. Alternatively, for example, when the ports P21 and P22 are high level and the ports P23, P24, and P25 are low level, a parallel circuit of the resistance elements R21 and R22 constitutes the upper arm of the resistance voltage divider circuit, and a parallel circuit of the resistance elements R23-R25 constitutes the lower arm. In addition, since the resistance values of the resistance elements R21-R25 are determined to be in the ratio based on powers of 2 with respect to a lowest value among these resistance values, the resistance voltage dividing ratio may take values in the fifth power of 2 (=32) ways depending on the combination of the ports P21-P25 in high level or low level.

The horizontal axis in FIG. 4 may also be referred to as 5-bit values from the ports P21-P25. Similarly, the vertical axis may also be referred to as a voltage ratio to the source voltage.

Figure 5:
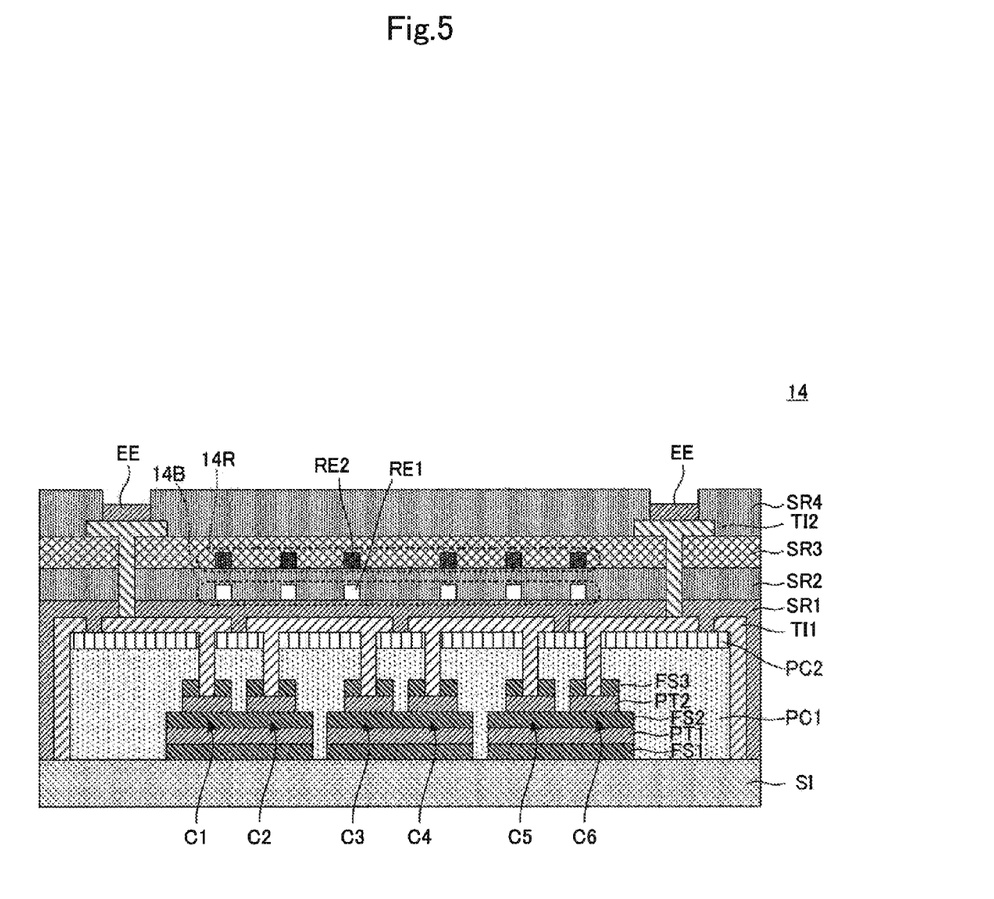
FIG. 5 is a sectional view of a main portion of the variable capacitance element 14.

FIG. 5 is a sectional view of a main portion of the variable capacitance element 14. In FIG. 5, a substrate SI is an Si substrate over which an $SiO_2$ film is provided. Ferroelectric films and Pt films are provided alternately over the substrate SI in an order of a ferroelectric film FS1, capacitor electrodes PT1, a ferroelectric film FS2, capacitor electrodes PT2, and a ferroelectric film FS3 to define a capacitor unit.

A film stack of the ferroelectric films FS1, FS2, and FS3 and the capacitor electrodes PT1 and PT2 is covered by a moisture-resistant protective film PC1. An organic protective film PC2 is further provided over the moisture-resistant protective film PC1.

A wiring film TI1 is provided over the organic protective film PC2. Further, the wiring film TI1 is connected to predetermined portions of the capacitor electrodes PT1 and PT2 through contact holes. Moreover, the wiring film TI1 is provided so as to surround the moisture-resistant protective film PC1 and the organic protective film PC2.

An interlayer insulation film SR1 is provided over a surface of the wiring film TI1. Over a surface of the interlayer insulation film SR1, a resistive film pattern RE1 is provided. A surface of the resistive film pattern RE1 is covered by an interlayer insulation film SR2, and a resistive film pattern RE2 is provided over a surface of the interlayer insulation film SR2. A surface of the resistive film pattern RE2 is covered by an interlayer insulation film SR3.

Resistive films of the resistive film pattern RE1 and RE2 are preferably formed by the thin film process (process utilizing photolithography and the etching technique) or the thick film process (process utilizing the printing technique such as screen printing), for example. The resistance values of the resistance elements are determined based on width, length, and thickness of the resistive film patterns.

A wiring film 112 is provided on a surface of the interlayer insulation film SR3. Further, the wiring film 112 is connected to the wiring film TI1 via contact holes provided through the interlayer insulation films SR1, SR2, and SR3.

A surface of the interlayer insulation film SR3 is covered by a solder resist film SR4. Then, externally-connected electrodes EE is provided in an opening in the solder resist film SR4 and over a surface of the wiring film TI2.

The ferroelectric film FS1 is an insulation film for close contact to and non-proliferation against the substrate SI and the moisture-resistant protective film PC1. Further, the ferroelectric film FS3 is an insulation film for close contact to the moisture-resistant protective film PC1. Examples of a conductive material used for the capacitor electrodes PT1 and PT2 include high-melting precious metal materials having favorable conductivity and excellent oxidation resistance, such as Pt and Au.

Further, examples of a thin-film material used for the ferroelectric films FS1, FS2, and FS3 include a dielectric material having a high dielectric constant. Specifically, materials such as a perovskite compound such as $(Ba,Sr)TiO_3(BST)$, $SrTiO_3$, $BaTiO_3$, and $Pb(Zr,Ti)O_3$, and a bismuth-layered compound such as $SrBi_4Ti_4O_{25}$ may be used.

Moreover, each of the wiring films TI1 and 112 preferably includes three layers of Ti, Cu, and Ti, in which a Ti layer is about 100 nm and a Cu layer is about 1000 nm in thickness, for example.

Furthermore, the externally-connected electrodes EE preferably include two layers of Au and Ni, in which an Ni layer as a first layer is about 2000 nm and an Au layer as a second layer is about 200 nm in thickness, for example.

The moisture-resistant protective film PC1 prevents moisture from the organic protective film PC2 from intruding into the capacitor unit. Examples of the moisture-resistant protective film PC1 that may be used include $SiN_x$, $SiO_2$, $Al_2O_3$, $TiO_2$, and the like. Further, the organic protective film PC2 absorbs an external mechanical stress. Examples of the organic protective film PC2 that may be used include a PBO (polybenzoxazole) resin, a polyimide resin, an epoxy resin, and the like.

A resistive material of the resistive film patterns RE1 and RE2 is Nichrome, for example.

A non-limiting example of a method of manufacturing the variable capacitance element 14 shown in FIG. 5 is as follows.

First, the Si substrate is subject to a thermal oxidation treatment to form an oxide layer of 700 nm thick $SiO_2$. The thickness of the oxide layer is not particularly limited as long as a desired insulation property is ensured, but preferably set to a range from about 500 nm to about 1000 nm, for example.

Then, the 50 nm thick ferroelectric film FS1 for close contact and non-proliferation is formed over the oxide layer using a chemical solution deposition (Chemical Solution Deposition, hereinafter referred to as "CSD") method. The thickness of the ferroelectric film FS1 is not particularly limited as long as a desired degree of contact and a desired degree of non-proliferation are ensured, but preferably set to a range from about 10 nm to about 100 nm, for example.

The examples of the material that may be used as the ferroelectric film FS1 are as listed above, but it is desirable to use the same material as that of the ferroelectric film FS2 for the capacitor. For example, when forming a BST film, a film formation material solution in which Ba, Sr, and Ti are blended in a molar ratio such as Ba:Sr:Ti=7:3:10 is prepared. Then, the film formation material solution is applied over an oxide layer 1, dried on a hot plate at 400 degrees Celsius, and is heat-treated for 30 minutes at 600 degrees Celsius to be crystallized, and thus a BST film is formed.

The temperature of the hot plate is not particularly limited as long as a desired degree of drying property is achieved, but preferably set to a range from about 300 degrees Celsius to about 400 degrees Celsius, for example. Further, the temperature of the heat treatment is not particularly limited as long as a desired degree of crystallization is achieved, but preferably set to a range from about 600 degrees Celsius to about 700 degrees Celsius, for example. In addition, duration of the heat treatment is not particularly limited as long as a desired degree of crystallization is achieved, but preferably set to a range from about 10 minutes to about 60 minutes, for example.

Next, the capacitor electrodes PT1, the ferroelectric film FS2, the capacitor electrodes PT2, and the ferroelectric film FS3 are sequentially formed. Specifically, the 250 nm thick capacitor electrodes PT1 made of Pt or Au is formed using an RF magnetron sputtering method, the 100 nm thick ferroelectric film FS2 made of BST or the like is formed using the CSD method, and then the 250 nm thick capacitor electrodes PT2 made of Pt or Au is formed using the RF magnetron sputtering method. Further, the 100 nm thick ferroelectric film FS3 made of BST or the like is formed using the CSD method.

The thickness of the capacitor electrodes PT1 and PT2 is not particularly limited as long as a desired low resistivity is ensured, but preferably set to a range from about 100 nm to about 500 nm, for example. Further, the thickness of the ferroelectric film FS2 is not particularly limited as long as a desired electrostatic capacitance is ensured, but preferably set to a range from about 80 nm to about 150 nm, for example. In addition, the thickness of the ferroelectric film FS3 is not particularly limited as long as a desired degree of contact is ensured, but preferably set to a range from about 80 nm to about 150 nm, for example.

Thereafter, each layer of the capacitor unit is patterned using a photolithography technique and a dry etching method (reactive ion etching (RIE) method). Specifically, a photoresist is applied and pre-baked, the photoresist is irradiated with ultraviolet light through a photo mask, and exposure, development, post-baking are performed to transfer a photo mask pattern to a resist pattern. Then, the exposed part is dry-etched using Ar gas or $CHF_3$ gas.

Subsequently, the capacitor unit is heat-treated for 30 minutes at 800 degrees Celsius. The temperature of the heat treatment is not particularly limited as long as a desired degree of heat treatment property is achieved, but preferably set to a range from about 800 degrees Celsius to about 900 degrees Celsius, for example. In addition, duration of the heat treatment is not particularly limited as long as a desired degree of heat treatment property is achieved, but preferably set to a range from about 10 minutes to about 60 minutes, for example.

Next, the 600 nm thick moisture-resistant protective film PC1 made of an inorganic material is formed so as to cover an upper surface and side surfaces of the capacitor unit as well as the ferroelectric film FS1 using a spattering method. Then, a PBO (polybenzoxazole) film made of a photopolymer material is applied so as to cover the moisture-resistant protective film PC1 using a spin coating method. Thereafter, heating for 5 minutes at 125 degrees Celsius, an exposure process, a development process, and heating for about an hour at 350 degrees Celsius are performed, and thus the 6000 nm thick organic protective film PC2 of a predetermined pattern is formed.

The thickness of the moisture-resistant protective film PC1 is not particularly limited as long as a desired moisture resistance is ensured, but preferably set to a range from about 200 nm to about 1000 nm, for example. Further, the thickness of the organic protective film PC2 is not particularly limited as long as a desired property of mechanical stress absorption is ensured, but preferably set to a range from about 2000 nm to about 10000 nm, for example.

Then, using the organic protective film PC2 as a mask and using a $CHF_3$ gas, the organic protective film PC2, the moisture-resistant protective film PC1, and the ferroelectric film FS2 are dry-etched and patterned to define contact holes (not depicted) reaching the capacitor electrodes PT1, and the organic protective film PC2, the moisture-resistant protective film PC1, and the ferroelectric film FS3 are dry-etched and patterned to define the contact holes reaching the capacitor electrodes PT2.

Next, three metallic layers to constitute the wiring film TI1 are formed using the RF magnetron sputtering method, and the wiring film TI1 is patterned by wet etching.

Then, the interlayer insulation film SR1 is spin-coated, a resistive film to be a resistance element 14B of the variable capacitance element unit is formed using the thin film process such as sputtering or electron beam evaporation, or using the thick film process by an application of a paste, and this resistive film is patterned using a liftoff method to form the resistive film pattern RE1.

Next, the interlayer insulation film SR2 is spin-coated, a resistive film to be the control voltage application circuit 14R is formed using the thin film process such as sputtering or electron beam evaporation, or using the thick film process by an application of a paste, and this resistive film is patterned using the liftoff method to form the resistive film pattern RE2.

Thereafter, the interlayer insulation film SR3 is spin-coated, and the contact holes reaching the wiring film TI1 are defined.

Next, three metallic layers to constitute the wiring film TI2 are formed using the RF magnetron sputtering method, and the wiring film TI2 is formed as an power supply film and then patterned by wet etching.

Subsequently, openings are defined at predetermined positions by spin coating the solder resist film SR4, and the externally-connected electrodes EE are formed by electrolytic plating.

In this manner, since ferroelectric capacitors are used as the variable capacitance elements, and since a plurality of resistance patterns having different resistance values are used for a bias voltage application circuit, it is possible to configure a small passive device having excellent frequency characteristics (=a variable capacitance element having a control voltage application circuit).

It should be appreciated that the present invention is not limited to the above-described preferred embodiment. The thickness of the layers, the formation methods, and the formation conditions are mere examples, and may be altered optionally as long as desired functions of a thin-film capacitor are achieved.

Further, while the description of the above preferred embodiments refers to the capacitor unit including a single layer structure with one capacitance generating unit, it should be appreciated that the present invention may similarly be applied to a multi-layer structure including two or more capacitance generating units.

Figure 6A:
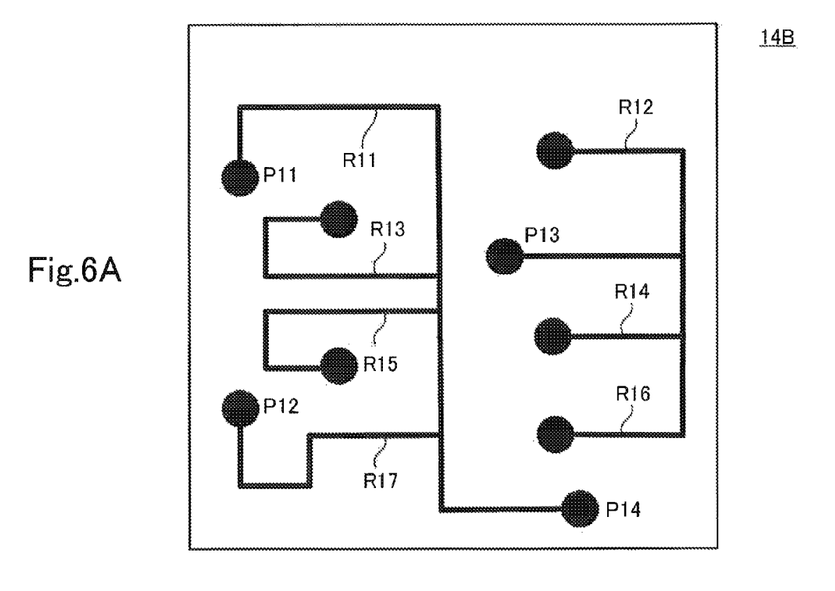
FIG. 6A illustrates a resistive film pattern of a resistance element 14B of a variable capacitance element unit.
Figure 6B:
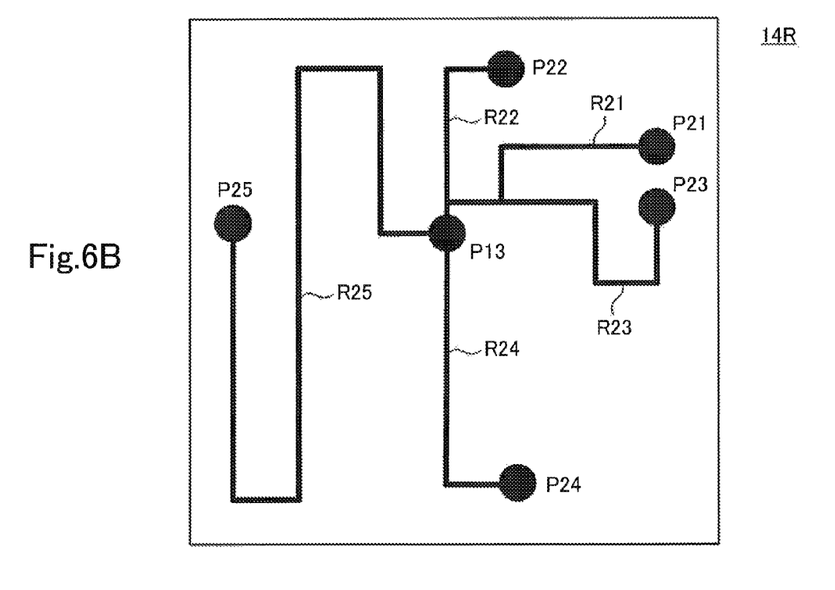
FIG. 6B illustrates a resistive film pattern of a control voltage application circuit 14R of the variable capacitance element unit.

FIG. 6A illustrates a resistive film pattern of the resistance element 14B of the variable capacitance element unit, and FIG. 6B illustrates a resistive film pattern of the control voltage application circuit 14R of the variable capacitance element unit. Ports P11-P14 and resistive film patterns R11-R17 shown in FIG. 6A correspond to the ports P11-P14 and the RF resistance elements R11-R17 shown in FIG. 3. Further, ports P21-P25 and resistive film patterns R21-R25 shown in FIG. 6B correspond to the ports P21-P25 and the resistance elements R21-R25 shown in FIG. 3.

As illustrated in FIG. 5 and FIGS. 6A to 6B, the variable capacitance elements and the control voltage application circuit are preferably formed by the thin film process on a semiconductor substrate. Specifically, the variable capacitance element unit and the control voltage application circuit unit are preferably formed monolithically on the same substrate. In particular, the plurality of resistance elements that constitute the control voltage application circuit are preferably provided in the same layer by the process. Therefore, it is possible to significantly reduce or prevent variation in the ratio between the resistance values itself even if the resistance values of the resistance elements are different from a desired resistance value, and thus it is possible to reproducibly control output voltages. On the other hand, while the variable capacitance elements preferably include a plurality of RF resistance elements parallely connected to both ends of the respective ferroelectric capacitors, these RF resistance elements are provided in a layer different from the plurality of resistance patterns that constitute the control voltage application circuit, and the RF resistance elements are also provided in the same layer by the same process.

Figure 7:
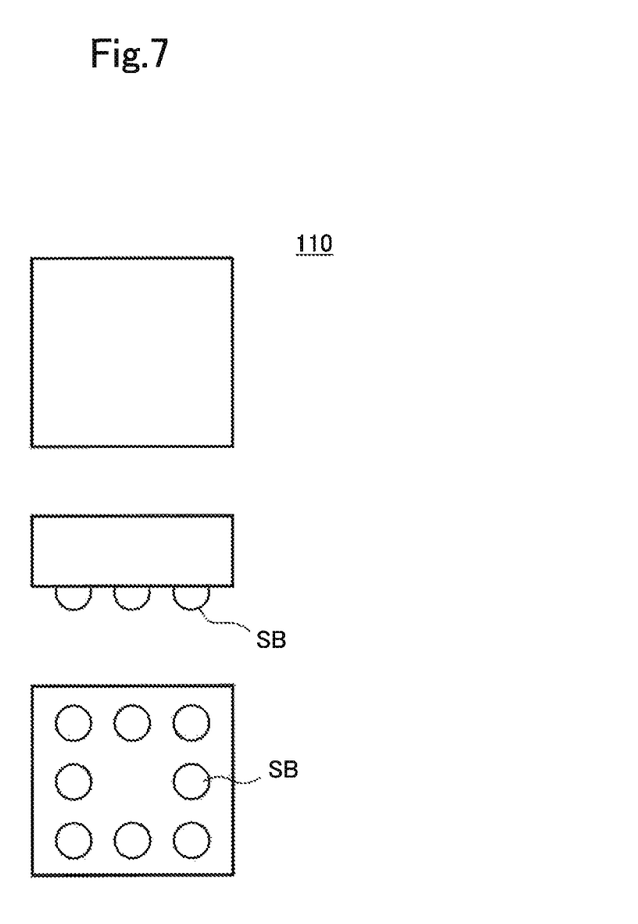
FIG. 7 is a three-view drawing of a variable-capacitance-element built-in RFIC 110.

FIG. 7 is a three-view drawing of the variable-capacitance-element built-in RFIC 110. As illustrated in FIG. 5, the variable-capacitance-element built-in RFIC 110 preferably is a bare chip separated from a wafer. The externally-connected electrodes (pads) EE of the IC is provided with solder balls SB.

A high-frequency device is configured by mounting the variable-capacitance-element built-in RFIC 110 on a substrate on which the antenna coil 13 (see FIG. 1) is disposed.

Figure 8:
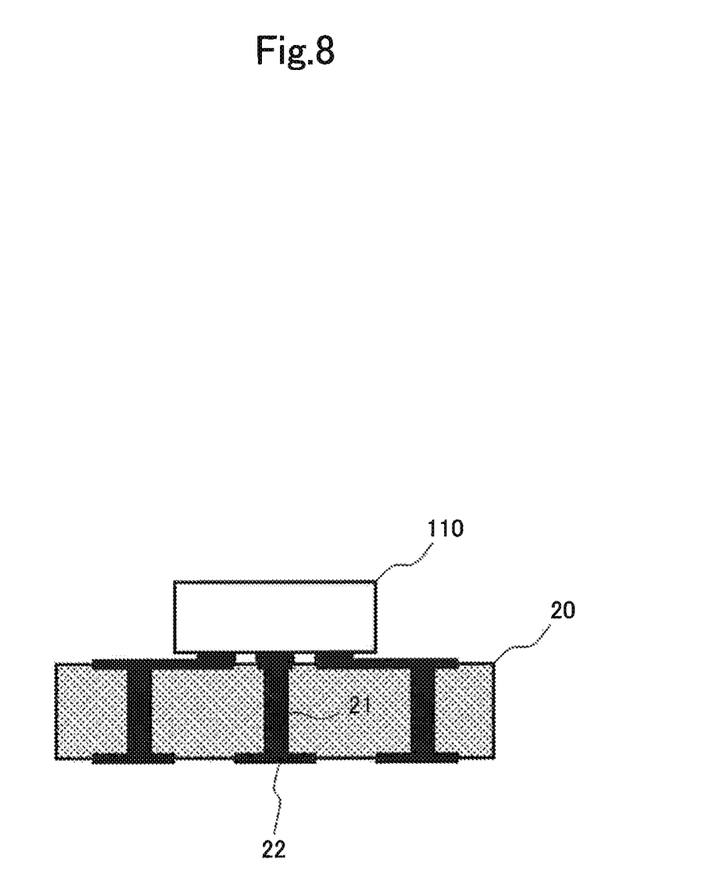
FIG. 8 is a sectional view of a state in which the variable-capacitance-element built-in RFIC 110 is mounted on a rewiring board 20.

FIG. 8 is a sectional view of a state in which the variable-capacitance-element built-in RFIC 110 is mounted on a rewiring board 20 used for mounting. On a lower surface of the rewiring board 20, terminals used for mounting 22 are provided, and on an upper surface, electrodes used to mount the variable-capacitance-element built-in RFIC 110 are provided. Further, rewiring electrodes 21 are provided within the rewiring board 20. In this manner, a module in which the variable-capacitance-element built-in RFIC 110 is mounted on the rewiring board 20 may be applied to a printed wiring board.

Other Preferred Embodiments

While specific preferred embodiments of the present invention have been described, the present invention is not limited to such examples.

For example, the variable capacitance element may be independently connected to the antenna coil in parallel, or a capacitor may be inserted in series to the variable capacitance element. Alternatively, the variable capacitance element may be independently connected to the antenna coil in series.

Further, a high-frequency device according to various preferred embodiments of the present invention is not limited to a reader/writer of RFIDs, and may be constituted as an RFID tag, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high-frequency device comprising:
   an antenna coil;
   a variable capacitance element configured to change a resonant frequency of an antenna circuit including the antenna coil; and
   an RFIC connected to the variable capacitance element; wherein
   the variable capacitance element includes:
      ferroelectric capacitors each configured such that a ferroelectric film is sandwiched between capacitor electrodes and such that a capacitance value changes according to a value of a control voltage applied between the capacitor electrodes; and
      a control voltage application circuit including a resistance voltage divider circuit including a plurality of resistance elements having different resistance values and configured to apply a control voltage to the variable capacitance element;
   the variable capacitance element is provided on a substrate and made of a thin film material, and the plurality of resistance elements are provided on the substrate in one layer;
   the variable capacitance element is provided in a single integrated circuit; and
   the one layer of the plurality of resistance elements is provided on top of a layer including the ferroelectric film.

2. The high-frequency device according to claim 1, wherein
   each of the plurality of resistance elements includes a first terminal connected to the control voltage application circuit and a second terminal connected to each of 10 terminals of the RFIC.

3. The high-frequency device according to claim 2, wherein the plurality of resistance elements are resistance patterns provided on the substrate, and each of the resistance patterns are provided such that resistance values of the plurality of resistance elements are in a ratio based on powers of 2 with respect to a lowest value among the resistance values.

4. The high-frequency device according to claim 1, wherein
   the variable capacitance element includes a plurality of RF resistance elements connected in parallel to both ends of the respective ferroelectric capacitors, and the RF resistance elements are provided in a layer different from a layer in which the plurality of resistance elements are provided.

5. The high-frequency device according to claim 1, wherein the variable capacitance element includes only one capacitance generating unit.

6. The high-frequency device according to claim 1, wherein the variable capacitance element includes at least two capacitance generating units.

7. The high-frequency device according to claim 1, wherein the variable capacitance element is connected to the antenna coil in parallel.

8. The high-frequency device according to claim 1, wherein the variable capacitance element is connected to the antenna coil via a capacitor connected in series to the variable capacitance element.

9. The high-frequency device according to claim 1, wherein the variable capacitance element is connected to the antenna coil in series.

10. The high-frequency device according to claim 1, wherein the high-frequency device is an RFID reader/writer.

11. The high-frequency device according to claim 1, wherein the high-frequency device is an RFID tag.

12. A variable capacitance element comprising:
    ferroelectric capacitors each configured such that a ferroelectric film is sandwiched between capacitor electrodes; and
    a control voltage application circuit connected to the ferroelectric capacitors, provided with a plurality of resistance elements having different resistance values, and configured to apply a control voltage whose value of a voltage applied to the ferroelectric capacitor changes in a plurality of ways; wherein
    the ferroelectric capacitors and the control voltage application circuit are provided on a substrate and made of a thin film material, and the plurality of resistance elements are provided on the substrate in one layer;
    both the ferroelectric capacitors and the control voltage application circuit are provided in a single integrated circuit; and
    the one layer of the plurality of resistance elements is provided on top of a layer including the ferroelectric film.

13. The variable capacitance element according to claim 12, wherein each of the plurality of resistance elements includes a first terminal connected to the control voltage application circuit and a second terminal configured to be connected to each of 10 terminals of an RFIC.

14. The variable capacitance element according to claim 13, wherein the plurality of resistance elements are resistance patterns provided on the substrate, and each of the resistance patterns are provided such that resistance values of the plurality of resistance elements are in a ratio based on powers of 2 with respect to a lowest value among the resistance values.

15. The variable capacitance element according to claim 12, further comprising a plurality of RF resistance elements connected in parallel to both ends of the respective ferroelectric capacitors, wherein the RF resistance elements are provided in a layer different from a layer in which the plurality of resistance elements are provided.

16. The variable capacitance element according to claim 12, wherein the variable capacitance element includes only one capacitance generating unit.

17. The variable capacitance element according to claim 12, wherein the variable capacitance element includes at least two capacitance generating units.

* * * * *